United States Patent
Dorner et al.

(10) Patent No.: US 9,858,719 B2
(45) Date of Patent: Jan. 2, 2018

(54) BLENDED REALITY SYSTEMS AND METHODS

(71) Applicant: Amazon Technologies, Inc., Seattle, WA (US)

(72) Inventors: Charles Shearer Dorner, Seattle, WA (US); Paul Barnhart Sayre, III, Gig Harbor, WA (US); William R. Hazlewood, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 268 days.

(21) Appl. No.: 14/673,533

(22) Filed: Mar. 30, 2015

(65) Prior Publication Data
US 2016/0292917 A1    Oct. 6, 2016

(51) Int. Cl.
| | |
|---|---|
| *G06T 15/50* | (2011.01) |
| *G06T 19/00* | (2011.01) |
| *G03B 21/20* | (2006.01) |
| *G02B 27/01* | (2006.01) |

(Continued)

(52) U.S. Cl.
CPC ............ *G06T 19/006* (2013.01); *G02B 27/01* (2013.01); *G02B 27/026* (2013.01); *G03B 21/2053* (2013.01); *G03B 21/2066* (2013.01); *G06T 7/70* (2017.01); *G06T 15/50* (2013.01); *G02B 2027/014* (2013.01); *G02B 2027/0138* (2013.01); *G06T 2207/10004* (2013.01); *G06T 2207/30201* (2013.01)

(58) Field of Classification Search
None
See application file for complete search history.

(56) References Cited

U.S. PATENT DOCUMENTS

| | | |
|---|---|---|
| 3,507,570 A | 4/1970 | Bourdier et al. |
| 5,639,151 A | 6/1997 | McNelley et al. |
| 6,257,727 B1 | 7/2001 | Melville |
| (Continued) | | |

FOREIGN PATENT DOCUMENTS

| | | |
|---|---|---|
| DE | 19943355 | 3/2001 |
| JP | 2010070889 | 4/2010 |
| WO | WO 2014/100250 | 6/2014 |

OTHER PUBLICATIONS

PCT Search Report and Written Opinion for Application No. PCT/US2016/024335 dated Jun. 14, 2016 in 15 pages.

*Primary Examiner* — Zhengxi Liu
*Assistant Examiner* — Khoa Vu
(74) *Attorney, Agent, or Firm* — Knobbe Martens Olson & Bear LLP

(57) ABSTRACT

Systems and methods are provided for generating a blended reality view to a user, the blended reality view combining images reflected by a mirror with images transmitted from a screen behind the mirror. Systems for generating blended reality views can include a display device with a screen positioned behind a mirror. The display device can generate a pattern of illumination and non-illumination on the screen so that the illuminated portions of the screen substantially transmit through the mirror. Projectors can be used to illuminate objects in front of the mirror so that the illuminated objects are reflected by the mirror. In combination, the portions of the screen transmitted through the mirror and the illuminated objects reflected by the mirror can provide a blended reality view to a user viewing the mirror.

20 Claims, 10 Drawing Sheets

(51) Int. Cl.
*G02B 27/02* (2006.01)
*G06T 7/70* (2017.01)

(56) References Cited

U.S. PATENT DOCUMENTS

| | | |
|---|---|---|
| 6,481,851 B1 | 11/2002 | McNelley et al. |
| 6,578,962 B1 | 6/2003 | Amir et al. |
| 6,999,649 B1 | 2/2006 | Chen et al. |
| 7,144,113 B2 | 12/2006 | Fujikawa et al. |
| 7,197,165 B2 | 3/2007 | Ryan |
| 7,307,675 B2 | 12/2007 | Abileah |
| 7,883,212 B2 | 2/2011 | O'Connell et al. |
| 8,172,400 B2 | 5/2012 | O'Connell et al. |
| 8,262,226 B2 | 9/2012 | LaDuke et al. |
| 8,326,025 B2 | 12/2012 | Boughorbel |
| 8,408,706 B2 | 4/2013 | Yahav |
| 8,462,192 B2 | 6/2013 | O'Connell |
| 8,493,496 B2 | 7/2013 | Freedman et al. |
| 8,594,425 B2 | 11/2013 | Gurman et al. |
| 8,649,025 B2 | 2/2014 | Teodorescu |
| 8,692,738 B2 | 4/2014 | Smithwick et al. |
| 8,717,417 B2 | 5/2014 | Sali et al. |
| 8,744,121 B2 | 6/2014 | Polzin et al. |
| 8,857,994 B2 | 10/2014 | Smithwick |
| 2003/0214459 A1 | 11/2003 | Nishihara et al. |
| 2005/0018140 A1* | 1/2005 | Ishizaki ............ A45D 44/005 353/28 |
| 2007/0288332 A1 | 12/2007 | Naito |
| 2008/0174704 A1* | 7/2008 | Tan ..................... H04N 9/3147 348/745 |
| 2010/0302138 A1 | 12/2010 | Poot et al. |
| 2011/0210970 A1 | 9/2011 | Segawa |
| 2012/0044335 A1* | 2/2012 | Goto .................. A45D 44/005 348/77 |
| 2012/0229592 A1* | 9/2012 | White ...................... H04N 7/15 348/14.08 |
| 2013/0100240 A1* | 4/2013 | Liu ........................ H04N 7/144 348/14.08 |
| 2013/0202161 A1 | 8/2013 | Shor et al. |
| 2013/0283208 A1* | 10/2013 | Bychkov ............... G06F 3/017 715/810 |
| 2015/0279113 A1* | 10/2015 | Knorr ................. G06T 19/006 345/633 |

\* cited by examiner

BLENDED REALITY SYSTEMS AND METHODS

BACKGROUND

For entertainment and other purposes, unique visual displays can enhance the experiences of users. These visual displays can be used to alter scenes as perceived by users, for example, by adding objects to the scene that do not actually exist. One method of providing such a visual display uses an illusionary technique referred to as "Pepper's ghost" that can produce a virtual object in a scene as a latent or ghost-like image. This illusionary technique uses glass angled relative to a viewer, a display or object out of direct view of a viewer, and tailored lighting schemes. However, such techniques are significantly limited, requiring space that extends beyond a visual display or that significantly increase the size of a visual display. In addition, these techniques can produce unrealistic results as the virtual objects placed in the scene are generally translucent and low contrast.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
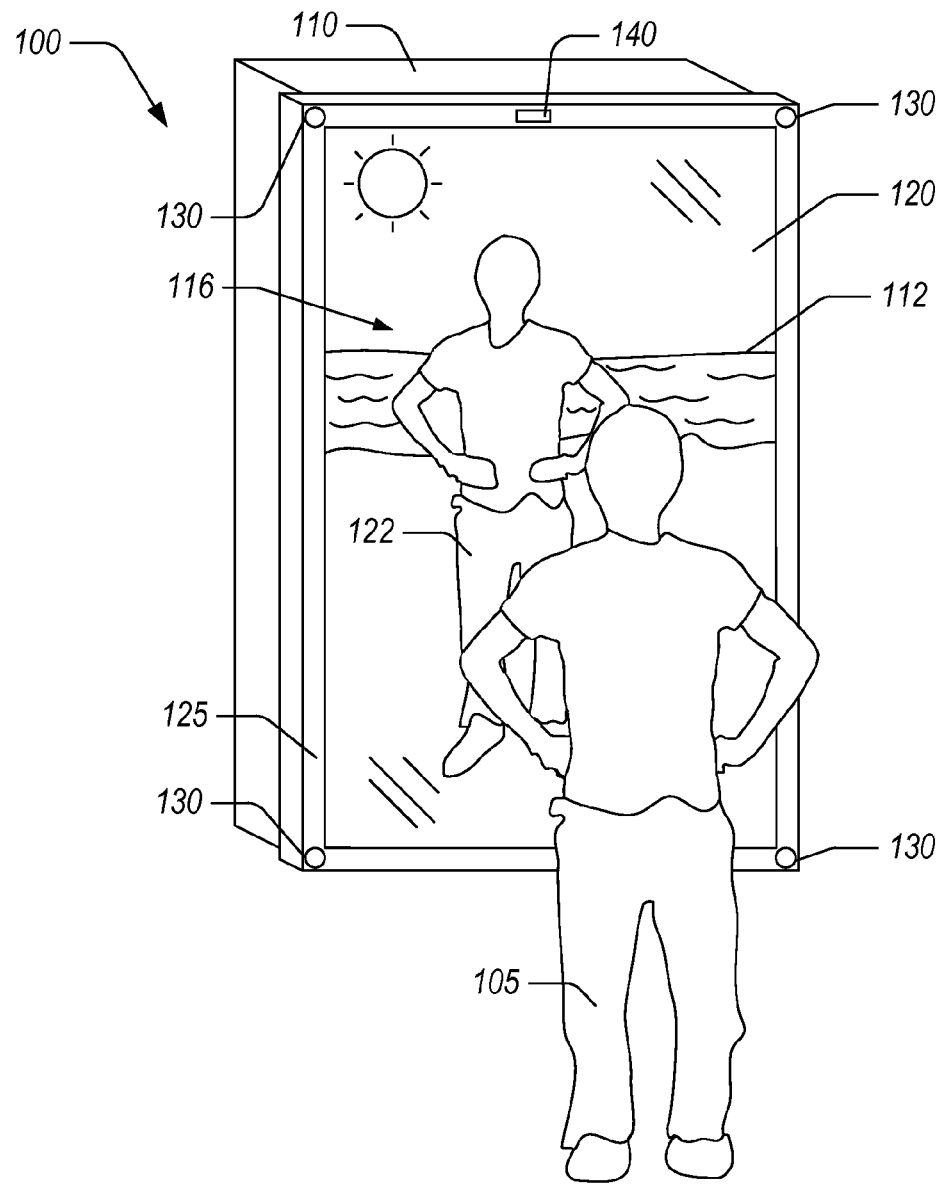
FIG. 1A illustrates an example blended reality apparatus configured to generate a blended reality view.

Generally described, aspects of the present disclosure relate to generating a blended reality view for a user by combining reflections from a mirror with light transmitted through the mirror by a display. The present disclosure includes systems and methods configured to blend transmitted and reflected light to form a single scene, as perceived by a user, by controlling the amount of light on either side of a mirror or other reflective element. A blended reality view can be used to provide a visual representation of the user in different settings other than the one the user is actually in. Similarly, the blended reality view can be used to provide a visual representation of items, such as clothes, on the user without the user actually wearing the physical item.

Display systems can be used to provide a view of objects that are not actually in a scene but that are perceived to be there by a user. This can be accomplished using angled glass and lighting techniques. Teleprompters, amusement park rides, heads up displays, visual illusions, and the like employ similar methods for providing a user a view of a portion of reality (e.g., light transmitted from a scene through the angled glass) along with a portion of projected objects (e.g., light reflected from an object or display by the angled glass).

However, challenges arise when it is desirable to combine a reflection of a user with projected images of virtual objects. Using angled glass with special lighting techniques does not provide such a view because the angled glass does not reflect an image of the user back to the user. In addition, attempting to combine a reflected view of the user with a view of projected images can result in undesirable superposition of reflections with projected images, sometimes called "ghosting." Without controlling which objects are seen as reflections by a user, this undesirable combination of reflected images with transmitted or projected images can result in an unclear image being perceived by the user.

In addition, visual displays that employ angled glass to project images to a user can use additional space for a display placed out of the direct line of site of the user. This can increase the size of a visual display making it difficult or cumbersome to install and/or use.

Accordingly, the present disclosure provides systems and methods that generate a blended reality view by controlling the amount of light transmitted through a mirror and the amount of light reflected from the mirror. Blended reality apparatuses and methods described herein reduce or eliminate undesirable superposition of reflected and projected images by controlling the amount of light transmitted through a mirror and an amount of light reflected by the mirror. Using a blended reality apparatus as disclosed herein, a viewer can see reflected light in a first region of a mirror, transmitted light in a second region of the mirror, and a controlled superposition of reflected and transmitted light in a third region of the mirror. Blended reality apparatuses disclosed herein can be configured to control which portions of a mirror provide reflected light to a user, which portions of the mirror provide transmitted light to the user, and which portions of the mirror provide a controlled superposition of reflected and transmitted light to the user. This may be desirable in a situation where a user wants to see how a new outfit would look in a particular setting. To generate a blended reality view, a blended reality apparatus can i) selectively illuminate the user, ii) leave the rest of the room dark, and/or iii) project an image of the particular setting (e.g., a restaurant), the projected image being shown on the display at a location where the user would have seen a reflection of objects or surfaces in the room. Because the user is illuminated, the user can see their reflection. Because the rest of the room is dark but the apparatus is projecting an image of the particular setting, the user can see the setting instead of a reflection of the room. Furthermore, the apparatus can also project an image of the new outfit so that the user sees a superposition of their reflection with the projected new outfit so that it appears as though the user is wearing the outfit.

The blended reality systems and methods disclosed herein can provide a blended reality view using a mirror that is transmissive and reflective, a plurality of projectors to selectively illuminate objects in a room in front of the mirror, and a display to selectively transmit images through the mirror. To provide the blended reality view, projectors can selectively illuminate objects in a room and the display can be used to project images through the mirror. Depending on the area of the mirror the user looks at, the light reaching the user's eye can be dominated by light reflected by the mirror, dominated by light transmitted through the mirror, or a combination of reflected and transmitted light. Thus, the blended reality view can be a combination of reflected images and transmitted images where the images are perceived by the user as a single scene. Furthermore, the blended reality systems and methods disclosed herein can provide the blended reality view using an apparatus that is compact relative to designs employing angled glass because the display and mirror can be attached or otherwise combined with one another so that a surface of the mirror is adjacent to and parallel to a surface of the display.

Although the examples and implementations described herein focus, for the purpose of illustration, on displays, projectors, cameras, and mirrors for generating blended reality views, one skilled in the art will appreciate that the techniques described herein may be applied to other processes, methods, or systems. For example, the techniques may be used with other types of visual displays that collect and process image data for purposes other than providing a blended reality view to a user, but instead generate visual impressions for a user or a group of users by combining transmitted images with reflections. Various aspects of the disclosure will now be described with regard to certain examples and embodiments, which are intended to illustrate but not limit the disclosure.

In one aspect, an apparatus can be configured to provide a user a simultaneous view of reflected and transmitted light to create a visual effect for the user that blends reflections with displayed images. The apparatus can include a mirror that is partially-reflective and partially-transmissive and a display device positioned on a first side of the mirror, the display device having a screen configured to generate light transmitted through the mirror. The apparatus can include a plurality of projectors positioned on a periphery of the mirror and oriented to project light onto a user when the user is positioned on a second side of the mirror, opposite the first side. The apparatus can include a camera configured to acquire image data of the user and the environment or scene on the second side the mirror. The apparatus can include an image blending system communicably coupled to the camera, the display device, and the plurality of projectors. The image blending system can be configured to determine a location of a user's eyes based on the image data acquired with the camera, display images with the display device so that portions of the screen are illuminated and portions of the screen are not illuminated, and control the projectors to illuminate portions of the user and/or objects in the scene. When the user views the mirror, the user sees a reflection from the mirror of illuminated objects in the scene and the transmitted images from the display device through the mirror, the transmitted images being perceived as part of the reflected scene.

Overview of an Example Blended Reality Apparatus

Turning now to FIG. 1A, an example blended reality apparatus 100 is illustrated that is configured to generate a blended reality view 116 for a user 105 by combining light reflected by a mirror 120 with light from a display device 110 transmitted through the mirror 120. The blended reality apparatus 100 includes a plurality of projectors 130 around or near a frame 125 of the mirror. The plurality of projectors 130 is configured to selectively illuminate objects in front of the mirror 120. The blended reality apparatus 100 includes one or more cameras 140 on or near the frame 125 of the mirror. The one or more cameras 140 are configured to acquire image data of the user 105 and objects in front of the mirror 120.

The blended reality apparatus 100 can generate the blended reality view 116 by controlling the illumination of objects in front of the mirror 120 using the projectors 130 and by generating images with the display device 110 behind the mirror 120. The blended reality view 116 includes a combination of reflected light (e.g., a reflection 122 of the user) and transmitted light (e.g., a beach scene 112 or a shirt 117 projected by the display device 110, as described herein with reference to FIGS. 1B and 1C, respectively). To generate the blended reality view 116, the blended reality apparatus 100 can use the one or more cameras 140. In a scanning phase, the one or more cameras 140 can be used to acquire image data of the environment in front of the mirror 120, where the environment in front of the mirror 120 includes objects, surfaces, and/or light sources that can be seen reflected in the mirror 120. In some embodiments, this first phase, or scanning phase, occurs during an initial setup of the blended reality apparatus 100. From this image data, a three dimensional virtual model of the environment can be generated. For example, simultaneous localization and mapping ("SLAM") techniques can be used to generate the virtual model. SLAM techniques can include acquiring image information of an environment to update an estimate of a position or positions of an object's location in the environment using Kalman filters, particle filters, and Monte Carlo methods. Other methods include combining information from optical cameras, infrared cameras, and/or range finders to determine and track locations of objects. Examples of such techniques can be found, for example, in U.S. Pat. No. 8,744,121 entitled "Device for Identifying and Tracking Multiple Humans Over Time," U.S. Pat. No. 8,717,417 entitled "Three-Dimensional Mapping and Imaging," and U.S. Pat. Pub. No. 2010/0302138 entitled "Methods and Systems for Defining and Modifying a Visual Representation," each of which is incorporated herein by reference in its entirety. In some embodiments, the one or more cameras 140 can be used to update the three dimensional virtual model from time to time, such as when requested by a user, at regular intervals, and/or when changes to the environment are detected.

In addition, during a tracking phase, the one or more cameras 140 can be used to acquire image data of the user 105 when the user is using the blended reality apparatus 100. The image data of the user 105 can be used to track the user's face and/or to determine the location of the user's eyes in relation to the mirror 120. The one or more cameras 140 can each have a field of view. The one or more cameras 140 can be configured to image a user positioned within the field of view of at least one of the one or more cameras 140. The field of views of one or more cameras 140 can overlap to provide regions where image information of the user is acquired from a plurality of angles. Accordingly, the blended reality apparatus 100 can perform the tracking phase when the user 105 is positioned within the field of view of at least one camera. In some embodiments, tracking of the user's face and/or the user's eyes may improve when the blended reality apparatus 100 includes a plurality of cameras and the user is positioned within the field of view of at least two cameras. In some embodiments, the blended reality apparatus 100 is configured to track the user's face and/or to determine the location of the user's eyes when the user is positioned in front of the mirror 120 such that the user 105 can see the user's own reflection (e.g., the user 105 is not positioned outside the frame 125 of the mirror 120). Example systems and methods configured to track a human head, face, and/or form in real time are described, for example, in U.S. Pat. No. 8,594,425 entitled "Analysis of three-dimensional scenes," and U.S. Pat. Pub. No. 2013/0202161 entitled "Enhanced Face Detection Using Depth Information," each of which is incorporated herein by reference in its entirety. In some embodiments, facial tracking is accomplished through the use of the Kanade-Lucas-Tomasi ("KLT") algorithm.

In some embodiments, the user's face can be tracked in real time or near real time with the one or more cameras 140. With the user's eyes located, reverse ray tracing (e.g., tracing rays of light from the user's eye to the mirror and to the environment) or other techniques can be performed to determine and associate the different parts of the environment the user can see. This information can then be used to control the projectors 130 to selectively illuminate objects and/or surfaces in the environment. This information can also be used to control the display device 110 to selectively illuminate portions of the mirror 120 from behind the mirror 120.

By way of analogy, in one embodiment, the mirror 120 can be thought of as a single pixel-based screen showing two images to be blended. The first image is the reflection of the user 122 and/or objects in the environment. Objects in the environment can include furniture, clothes, books, toys, devices, and the like. Objects in the environment can also include walls, floors, ceilings, or other structures. Objects in the environment can also include any surface, texture, or other feature visible as a reflection in the mirror 120. The first image can be calculated based on the user's eye position from the image data acquired with the one or more cameras 140. For example, reverse ray tracing can be done to determine the objects visible in the mirror using information about the user's eye position and the locations of objects in the environment. The second image is the virtual image 112 generated by the display device 110 where the virtual image 112 is transmitted through the mirror 120. The blending of the two images can be accomplished by controlling the relative intensities of the light in both images. For example, light intensity and/or color at each pixel in the display and/or light intensity and/or color projected by the projectors on different objects can be varied to achieve a desired mixing of light at the user's eye. At each "pixel" or location on the mirror 120, the image seen by the user corresponds to the image providing the most light at that pixel. For example, if the first image, or reflection, is to be seen at a particular location on the mirror 120 then the projectors 130 can be configured to illuminate whatever object the user will see when looking at the mirror 120 at that particular location on the mirror 120. This determination is based on the location of the user's eyes and the three dimensional virtual model of the environment. The display device 110 can be dark, blank, display a solid color (e.g., black, white, blue, or other color), or display a selected pattern at the corresponding location. If on the other hand the second image, or virtual image, is to be seen at a particular location on the mirror 120 then the display device 110 can be configured to transmit light from behind the mirror 120 using a pixel or collection of pixels that corresponds to that particular location on the mirror 120. The projectors 130 can be configured to not illuminate whatever object the user sees when looking at the mirror 120 at that particular location on the mirror 120. As a result, the user 105 sees at each "pixel" or location on the mirror 120 reflected light or transmitted light. The user then perceives a blending of the two images resulting in a single blended reality scene.

Figure 2:
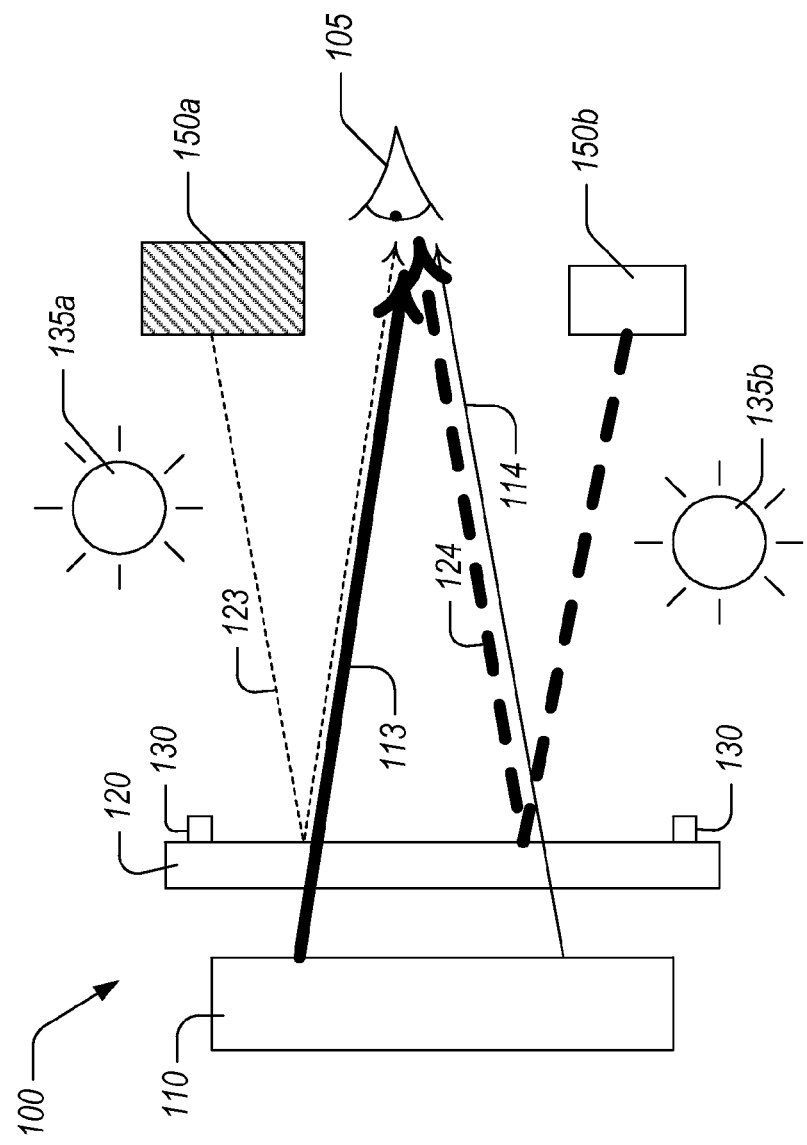
FIG. 2 illustrates a diagram of a user simultaneously perceiving reflected light and transmitted light, wherein the respective intensities of the reflected and transmitted light are controlled by a blended reality apparatus.

FIG. 2 illustrates a diagram of a user 105 simultaneously perceiving reflected light and transmitted light, wherein the respective intensities of the reflected and transmitted light are controlled by the projectors 130, the display device 110, and/or ambient light sources 135a, 135b. The blended reality apparatus 100 can be configured to control the light in the environment using the projectors 130. The light from the projectors 130 can be controlled to control reflected light intensity at the mirror 120 on a "per pixel" basis meaning that the image or light pattern projected by each projector 130 can be configured to result in desired reflected light intensity at particular locations on the mirror 120. In some embodiments, the blended reality apparatus 100 can also control ambient lighting in the environment using lights 135a, 135b in the environment or lights outside of the environment. The lights 135a, 135b are generally not controllable on a "per pixel" basis because they are generally diffuse sources of light. However, the intensity and/or color of light from the lights 135a, 135b can be controlled. Furthermore, the blended reality apparatus 100 can be configured to control transmitted light using the display device 110. The display device 110 can also be controlled on a "per pixel" basis.

As shown in FIG. 2, the user 105 will perceive an image based on the light arriving at the user's eye. In the figure, solid lines 113, 114 represent transmitted light from the display device 110 and dashed lines 123, 124 represent light reflected from surfaces in the environment. The thickness of the lines corresponds to the relative intensity of the light. When looking at a particular region of the mirror 120, the user will perceive a transmitted or virtual image if light from the display device 110 transmitted through the mirror 120 in that region dominates the light from a surface 150a reflected from that region of the mirror 120 (e.g., transmitted light 113 dominates reflected light 123). To increase the contrast between transmitted light and reflected light, the surface 150a can be left unilluminated by the projectors 130. The contrast between transmitted light and reflected light can be the difference in light intensity of the two sources. For example, the contrast between transmitted light and reflected light can be expressed as (IT−IR)/(IT+IR), where IT is the intensity of transmitted light and IR is the intensity of reflected light. When looking at a particular region of the mirror 120, the user will perceive a reflected image where light from a surface 150b reflected at the particular location on the mirror 120 dominates light transmitted by the display device 110 through the mirror at the particular location (e.g., the reflected light 124 dominates transmitted light 114). To increase the contrast between reflected and transmitted light, the surface 150b can be illuminated by the projectors 130. In some situations, it may be undesirable for a user to see a combination of reflected light and transmitted light at a single "pixel" or location on the mirror 120. This undesirable combination can be reduced or eliminated by increasing the contrast between the reflected and transmitted light. To reduce or eliminate undesirable superposition of reflected and transmitted images, the intensity of the light that is not to be perceived can be reduced or eliminated. In the case of the display device 110, this can mean not illuminating that portion of the display device 110 or using an active element to block that portion of the display device 110. Examples of such active elements are described in greater herein with reference to FIGS. 3B and 6B. In the case of reflections from objects in front of the mirror, this can mean not illuminating the surface with the projectors 130 and/or reducing or eliminating ambient lighting. In some situations, it may be desirable for a user to see a combination of reflected light and transmitted light at a location on the mirror 120. The desirable combination can be controlled by controlling the respective intensities of reflected and transmitted light. As used herein, intensity of light can be used to mean the number of photons per unit area per solid angle (e.g., radiant intensity), or power emitted by a light source weighted according to the sensitivity of the human eye (e.g., luminous intensity), brightness of a light source, or other such measurement used to quantify the power emitted by a light source or perceived by a viewer. In some embodiments, the ratio of intensities of light can be configured to achieve a desired effect. For example, where the user sees reflected light, the ratio of intensities of reflected light to transmitted light can be about 2:1, about 3:1, about 4:1, about 5:1, or greater than about 5:1. Similarly, where the user sees transmitted light, the ratio of intensities of transmitted light to reflected light can be about 2:1, about 3:1, about 4:1, about 5:1, or greater than about 5:1.

In some embodiments, it may be desirable to blend transmitted light with reflected light. This can be accomplished by varying the intensity of illumination provided by the projectors 130 on a surface and the intensity of the light provided by the display device 110. The relative intensities of reflected and transmitted light can be varied to produce desired effects, such as overlaying a virtual image on a reflected image. For example, this can be used to show the user 105 how an article of clothing or make up would look on the user 105.

In some embodiments, the blended reality apparatus 100 is configured to illuminate the user 105 and objects in the environment so that the user sees the user's own reflection while reflections of objects in the environment are reduced or eliminated. This can be used to substantially isolate the user's reflection. This can reduce computational costs due at least in part to the blended reality apparatus 100 not determining what to display in each pixel or location of the mirror 120. Rather, the blended reality apparatus 100 determines the portions of the user to illuminate with the projectors 130 while leaving the rest of the environment without illumination from the projectors 130. In some implementations, the display device 110 displays a substantially uniform color or pattern to help in isolating the reflection of the user 105.

Figure 1B:
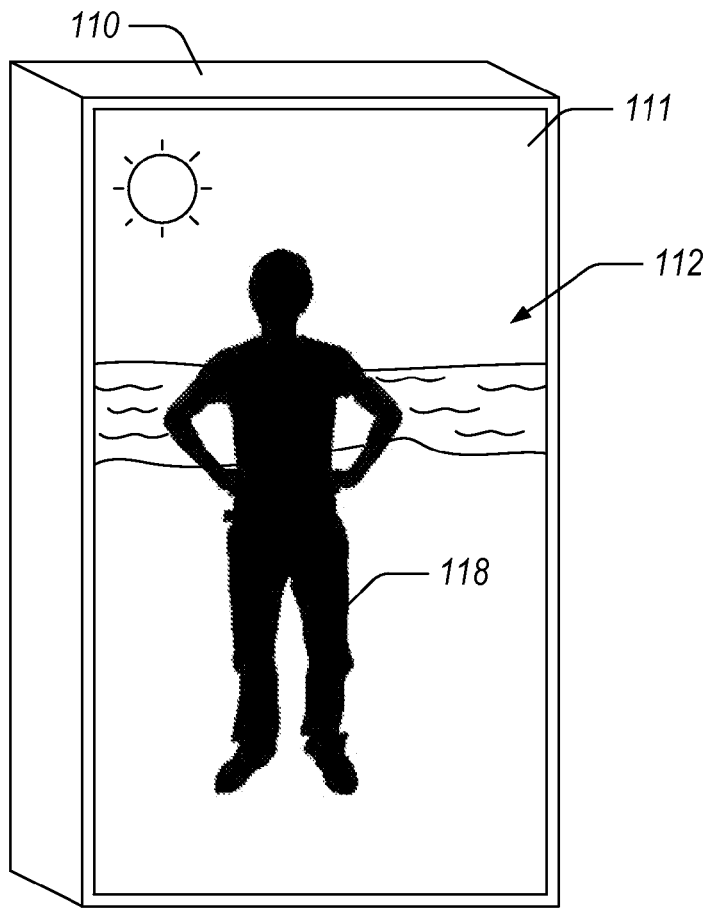
FIGS. 1B and 1C illustrate a display of the example blended reality apparatus of FIG. 1A.

To generate a blended reality view where the user sees the user's own reflection along with an artificial scene, the display device 110 of the blended reality apparatus 100 can be configured to project an image or light from targeted pixels and project no relatively little light at other targeted pixels. An example of this is illustrated in FIG. 1B. FIG. 1B illustrates the display device 110 of the blended reality apparatus 100 illustrated in FIG. 1A, with the mirror 120 and other components removed. The display device 110 includes a screen 111 that displays an image 112 (e.g., the beach scene 112) but with a portion of the screen 111 shown in black. This black portion 118 corresponds to the portion of the mirror 120 where a reflection of the user 105 is to be perceived by the user 105 rather than an image transmitted by the display device 110. The black portion 118 can be configured to transmit little or no light so that the light reflected from the mirror 120 at that location on the mirror 120 dominates the light transmitted through the mirror 120 at that location on the mirror 120. The size, shape, color, and other properties of the black portion 118 can change depending on the targeted or desired blended reality view 116 provided to the user. For example, in some cases the black portion 118 can include projected images, colors, textures, patterns, or the like that are intended to be mixed with reflected images so that the user perceives a combination of transmitted and reflected light. The shape of the black portion 118 can be determined based on the location of the user's eyes as well as the desired or targeted blended reality view 116. For example, as described herein, the blended reality apparatus 100 can utilize reverse ray tracing or other techniques to determine which portions of the display device 110 to illuminate and how to illuminate those portions. The blended reality apparatus 100 can use images of the user 105 acquired with the one or more cameras 130 to update the shape of the user's body to change the shape of the black portion 118 as the user 105 moves. The blended reality apparatus 100 can be configured to update the shape of the black portion 118 in real time.

Figure 1C:
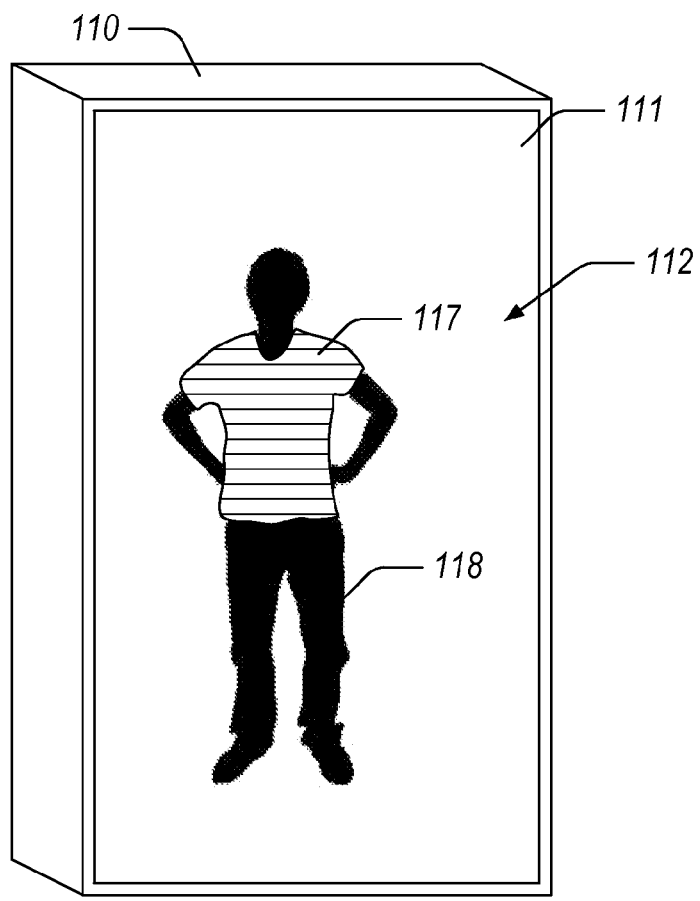

To generate a blended reality view where the user sees an article of clothing or other object superimposed on the user's body, the display device 110 of the blended reality apparatus 100 can again be configured to project an image or light from targeted pixels and project no relatively little light at other targeted pixels. An example of this is illustrated in FIG. 1C. The display device 110 in this scenario displays an image of a shirt 117 such that the user 105 views the image of the shirt superimposed on the user's body. The image of the shirt 117 can be adjusted to fit the body of the user by adjusting the size of the shirt based on an analysis of images of the body of the user acquired with the one or more cameras 140. In some embodiments, a visual approximation can be made to adjust the properties of the shirt 117 as displayed by the display device 110. The visual approximation can be based on images of the shirt acquired when the shirt was worn by another person, wherein the images of the shirt are adjusted based on the body of the user 105. The concepts described with reference to FIGS. 1B and 1C can be combined. For example, the blended reality apparatus 100 can be configured to provide a blended reality view that includes a projected scene to change an environment around the user 105 (e.g., the beach scene 112 illustrated in FIG. 1B) and an object to be perceived as being worn by the user 105 (e.g., the shirt 117 illustrated in FIG. 1C).

Additionally, the blended reality apparatus 100 can be configured to substantially isolate a reflection of the user 105 such that a reflection of environment around the user is suppressed. For example, this may be accomplished by using the display device 110 to project a tailored scene 112 around the user 105 (e.g., a substantially uniformly lit scene, a scene that is substantially white, a scene that is substantially black, a scene lacking sharp details, a scene lacking discernible objects, or the like) and/or by not illuminating objects in the environment with the projectors 130. By isolating the user's reflection, the user 105 may be able to focus more on the user's own reflection due at least in part to a reduction of potentially distracting objects being viewed by the user 105 in the mirror 120. This can also reduce the computational costs associated with generating a blended reality view that includes objects or scenes to be viewed along with the reflection of the user 105.

Returning to FIG. 1A, the display device 110 of the blended reality apparatus 100 is positioned on a first side of the mirror 120. In use, the user 105 can be positioned on a second side of the mirror 120, opposite the first side, so that the user 105 can see the user's own reflection in the mirror 120. The display device 110 can be a device having a screen, such as an LCD or plasma television, or the display device 110 can be a projector. In some embodiments, the display device 110 is configured to be parallel to the mirror 120. In some embodiments, a screen of the display device 110 is configured to have a width that is substantially the same width as the mirror 120 and a height that is substantially the same height as the mirror 120. In some embodiments, the display device 110 can be configured to project images that can substantially cover the surface area of the mirror 120. For example and without limitation, the width of the screen or the width of the projected image can be at least 80% and/or less than or equal to about 120% the width of the mirror 120, at least 90% and/or less than or equal to about 110% the width of the mirror 120, at least 95% and/or less than or equal to about 105% the width of the mirror 120, or at least 97% and/or less than or equal to about 103% the width of the mirror 120. Similarly, the height of the screen or the height of the projected image can be at least 80% and/or less than or equal to about 120% the height of the mirror 120, at least 90% and/or less than or equal to about 110% the height of the mirror 120, at least 95% and/or less than or equal to about 105% the height of the mirror 120, or at least 97% and/or less than or equal to about 103% the height of the mirror 120. In some embodiments, the display device 110 can be made up of multiple displays and/or screens.

The display device 110 can be attached to the mirror 120 to form a unitary structure. In some embodiments, the display device 110 can be attached to the mirror 120 so that the display device 110 can be removed or replaced without damaging the mirror 120. The display device 110 can have a surface that is adjacent to and parallel to a surface of the mirror 120. In this configuration, the blended reality apparatus 100 can have a depth that is a combination of the thickness of the mirror 120 and the thickness of the display device 110. This can result in a relatively compact apparatus suitable for installation in many environments, such as in a fitting room, in a closet, and/or hung on a wall.

The mirror 120 can be a sheet of material that is reflective and transmissive, such as glass or acrylic. The mirror 120 can be treated to balance transmittance, reflectance, and absorptance properties to achieve targeted or desired results. The mirror 120 can be a half-silvered mirror, similar to a beam splitter, that has balanced reflectance and transmittance properties in the visible spectrum (e.g., the mirror's reflectance and transmittance are about equal in the wavelength range between 350 nm and 700 nm). The mirror 120 can be planar or it can have a curved surface. The front side of the mirror 120 can be designated as the side of the mirror 120 facing the user 105 when the user 105 is viewing their reflection. With this convention, the display device 110 is positioned facing the back side of the mirror 120 so that light emitted from the display device 110 passes through the mirror 120 from the back side to the front side to eventually reach the user 105. The mirror 120 can include the frame 125 to provide support for the mirror 120 as well as providing a place to attach the one or more cameras 140 and/or the projectors 130.

The projectors 130 of the blended reality apparatus 100 can be positioned around the mirror 120, such as integrated into the frame 125 of the mirror 120. The projectors 130 can be configured to project light into the environment in front of the mirror (e.g., where the user 105 stands when perceiving the blended reality view 116). As described in greater detail herein, the projectors 130 can be positioned at other locations. The blended reality apparatus 100 can include at least 2 projectors, at least 3 projectors, at least 4 projectors, at least 5 projectors, at least 6 projectors, at least 7 projectors, at least 8 projectors, more than 8 projectors, or less than 10 projectors. In some embodiments, the projectors 130 can be positioned along at least two orthogonal axes. For example, projectors can be positioned at the midpoints of the frame 125 or at the corners of the frame 125. The projectors 130 can be configured to generate a combined light output as if positioned at the user's eyes to achieve targeted or desired lighting effects. The combined light output from the projectors 130 can be configured to illuminate desired or targeted surfaces in the environment (including the user) and to leave other surfaces without illumination from the projectors. In some embodiments, the projectors 130 can be coupled to motors or other actuators to change an orientation of the projectors 130. This can be done to change the pointing direction of the projectors 130 to enable illumination of different objects.

The one or more cameras 140 of the blended reality apparatus 100 can be attached to the mirror 120 or positioned elsewhere. The one or more cameras 140 can be configured to acquire image data of the environment in front of the mirror 120. The one or more cameras 140 can be configured to acquire image data of the user 105 when positioned in the environment in front of the mirror 120. The one or more cameras 140 can include image acquisition devices sensitive to different portions of the electromagnetic spectrum. For example, at least one camera can be sensitive to light in the visible portion of the spectrum and at least one camera can be sensitive to light in the infrared portion of the spectrum. The one or more cameras 140 can also include time of flight cameras or other similar sensors configured to determine distances to objects or surfaces in the environment. The one or more cameras 140 can include depth finding or range finding devices configured to determine a distance to one or more objects within a field of view of the respective device. In some embodiments, the one or more cameras 140 can be coupled to motors or other actuators to change an orientation one or more of the cameras 140. This can be done to change the pointing direction of one or more of the cameras 140 to acquire images of different objects and/or to track movements of the user or objects.

The information acquired with the one or more cameras 140, such as image and/or depth information, can be used to construct a virtual model of the environment for the blended reality apparatus 100. The virtual model can include a digital representation of objects and surfaces in the environment and their relative positions, orientations, colors, reflectivities, and the like. The virtual model can be used to determine the patterns of light or images to be generated by the one or more projectors 130 to achieve a targeted or desired reflected image for the user 105. Example systems and methods for constructing three dimensional virtual models of an environment using image data are described in U.S. Pat. No. 8,594,425 entitled "Analysis of three-dimensional scenes," U.S. Pat. No. 8,717,417 entitled "Three-Dimensional Mapping and Imaging," U.S. Pat. No. 8,326,025 entitled "Method for Determining a Depth Map from Images, Device for Determining a Depth Map," and U.S. Pat. No. 8,649,025 entitled "Methods and Apparatus for Real-Time Digitization of Three-Dimensional Scenes," each of which is incorporated herein by reference in its entirety.

In some embodiments, the blended reality apparatus 100 can be configured to perform a light-based scan of the environment to determine properties of the environment. This information can be used to determine the light to be projected by the projectors 130 and/or ambient lights. In certain implementations, the blended reality apparatus 100 performs this scan instead of constructing a virtual model of the environment. This can reduce the computational costs of generating a blended reality view. As an example, the blended reality apparatus 100 can be configured to incrementally increase or decrease the intensity of ambient lights or projectors 130 to illuminate the environment. The one or more cameras 140 can acquire images of the environment at the different levels of illumination. Based at least in part on the acquired images, the blended reality apparatus 100 can be configured to determine properties of the environment (e.g., color, reflectivity, etc.). Using these properties, the blended reality apparatus 100 can determine the targeted illumination to be provided by the projectors 130 to generate a targeted blended reality view. In certain implementations, the blended reality apparatus 100 controls the projectors 130 and/or ambient lights to illuminate targeted portions of the environment to characterize the optical properties of those targeted portions. Again, using the characterized optical properties of the environment (e.g., color, reflectivity, etc.), the blended reality apparatus 100 can determine the targeted illumination to be provided by the projectors 130 to generate a targeted blended reality view. In some implementations, the blended reality apparatus 100 can be configured to use depth information acquired with the one or more cameras 140 to determine the illumination pattern provided by the projectors 130. For example, the depth information can be used to determine which objects are background objects and which objects are foreground objects (e.g., such as the user 105). The blended reality apparatus 100 can then illuminate the foreground objects with the projectors 130 while leaving the background objects unilluminated. In some implementations, the blended reality apparatus 100 can be configured to project patterns of light onto surfaces in the environment to generate depth maps of the environment. Examples of systems and methods for generating depth maps using projected light and/or acquired images of an environment are described in U.S. Pat. No. 8,493,496 entitled "Depth Mapping Using Projected Patterns," U.S. Pat. No. 8,326,025 entitled "Method for Determining a Depth Map from Images, Device for Determining a Depth Map," and U.S. Pat. No. 8,649,025 entitled "Methods and Apparatus for Real-Time Digitization of Three-Dimensional Scenes," each of which is incorporated by reference herein in its entirety.

The one or more cameras 140 can also be used to identify and track a face of the user 105 to determine the location of the user's eyes. Any suitable method or algorithm can be used to accomplish this. For example, an infrared beam and an infrared camera can be used to determine the location of the users' eyes based on reflected infrared light from the retinas. Other facial and/or eye tracking systems and methods are described in U.S. Pat. No. 8,408,706 entitled "3D Gaze Tracker," U.S. Pat. No. 6,578,962 entitled "Calibration-Free Eye Gaze Tracking," and U.S. Pat. No. 7,197,165 entitled "Eye Tracking Using Image Data," each of which is incorporated herein by reference in its entirety.

The blended reality apparatus 100 can be used in a number of ways. A first example involves reflecting the head and shirt of a user and transmitting an image of clothing on the rest of the user, thereby providing a blended reality view that shows the user what the user was wearing the last time the user wore that shirt. To accomplish this, the blended reality apparatus 100 can control the projectors 130 to illuminate the head and shirt of the user so that they are reflected to the user and control the display device 110 to transmit an image or images of the other articles of clothing the user was wearing. A second example involves providing a reflection of the user along with transmitted scenes of different environments. This may be desirable when the user is trying on clothing to provide the user a view of how the outfit would look in different settings. The blended reality apparatus 100 can control the projectors 130 to illuminate the user so that the user sees their own reflection and control the display device 100 to transmit images of different settings. The result can be that the actual surroundings of the user (e.g., the user's closet or a dressing room) are replaced with images of the beach, a restaurant, an office, or the like. The ambient lights can also be adjusted to accomplish a targeted or desired effect.

Figure 3A:
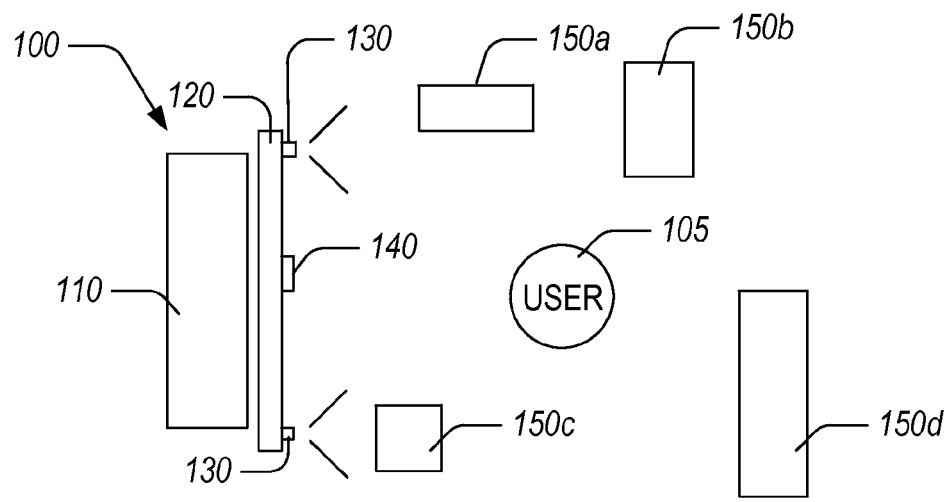
FIG. 3A illustrates a top view of an example blended reality apparatus, wherein the apparatus includes a plurality of projectors configured to selectively illuminate objects within an environment in front of the mirror.

FIG. 3A illustrates a top view of the example apparatus 100 of FIG. 1A, wherein the apparatus 100 includes a plurality of projectors 130 configured to selectively illuminate surfaces 150a-d within an environment in front of the mirror 120. The projectors 130 can be high-contrast projectors configured to project a range of visible wavelengths with high dynamic range. The projectors include modulating panels (e.g., liquid crystal on silicon panels, liquid crystal device panels, digital micromirror device panel, etc.) configured to generate patterns of light for projection. The projectors 130 can be configured to project light at targeted areas. As an example, to illuminate object 150c so that its reflection is seen in the mirror 120 by the user 105, each projector 130 can determine (e.g., through an analysis of the virtual model of the environment created by the blended reality apparatus) the pattern of light necessary to illuminate object 150c but to not illuminate, for example, object 150d. The combined light output from the projectors 130 can thus illuminate targeted objects or surfaces in the environment while leaving others dark.

Figure 3B:
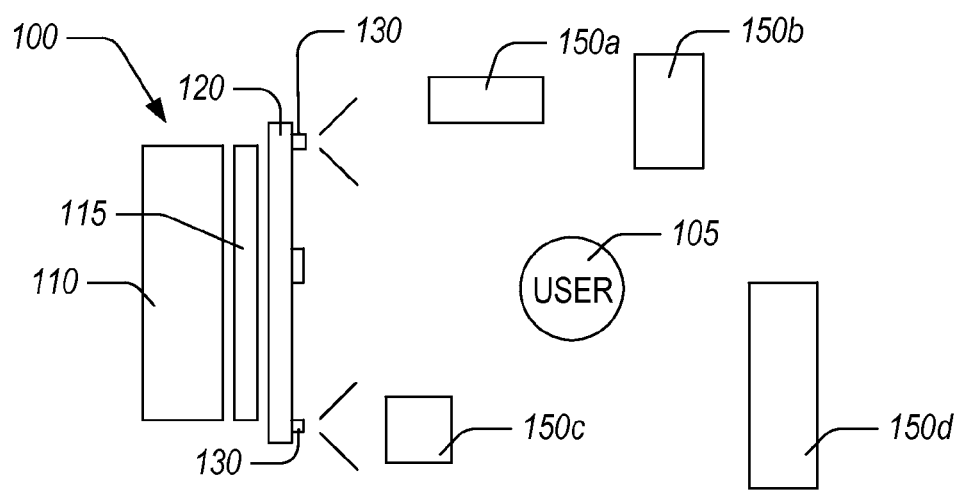
FIG. 3B illustrates a top view of an example blended reality apparatus, the apparatus including an active transmission matrix between a display and a mirror.

FIG. 3B illustrates a top view of the example apparatus 100, the apparatus 100 including an active transmission matrix 115 between the display 110 and the mirror 120. The active transmission matrix 115 comprises an active electronic element that can change the optical properties of individual pixels in the matrix. For example, the active transmission matrix 115 can be a liquid crystal matrix configured to control individual pixels, changing selected pixels from opaque to transparent (e.g., a pixel will block or transmit light) to further regulate the light transmitted from the display device 110 through the mirror 120. This can improve control over reflected and transmitted light perceived by the user. The active transmission matrix 115 can also be a material that can selectively change individual pixels from opaque to reflective or from transmissive to reflective. In some embodiments, the active transmission matrix 115 can be integrated with the mirror 120 or integrated with the display device 110. In some embodiments, the active transmission matrix 115 is the mirror 120 such that the mirror 120 can change the reflectance of individual pixels on a face of the mirror 120. For example, the active transmission matrix 115 can include a liquid crystal switchable mirror comprising a solid state thin film device that can be configured to switch between reflective, partially reflective, and transparent states. Examples of such apparatuses are disclosed in U.S. Pat. No. 6,999,649 entitled "Optical Switches Made by Nematic Liquid Crystal Switchable Mirrors, and Apparatus of Manufacture," which is incorporated herein by reference in its entirety. This implementation advantageously provides greater control over reflected and transmitted images seen by the user. The active transmission matrix 115 and the projectors 130 can thus combine to enhance the blended reality image by providing greater control over the transmission and reflection of light at the mirror 120.

Figure 4:
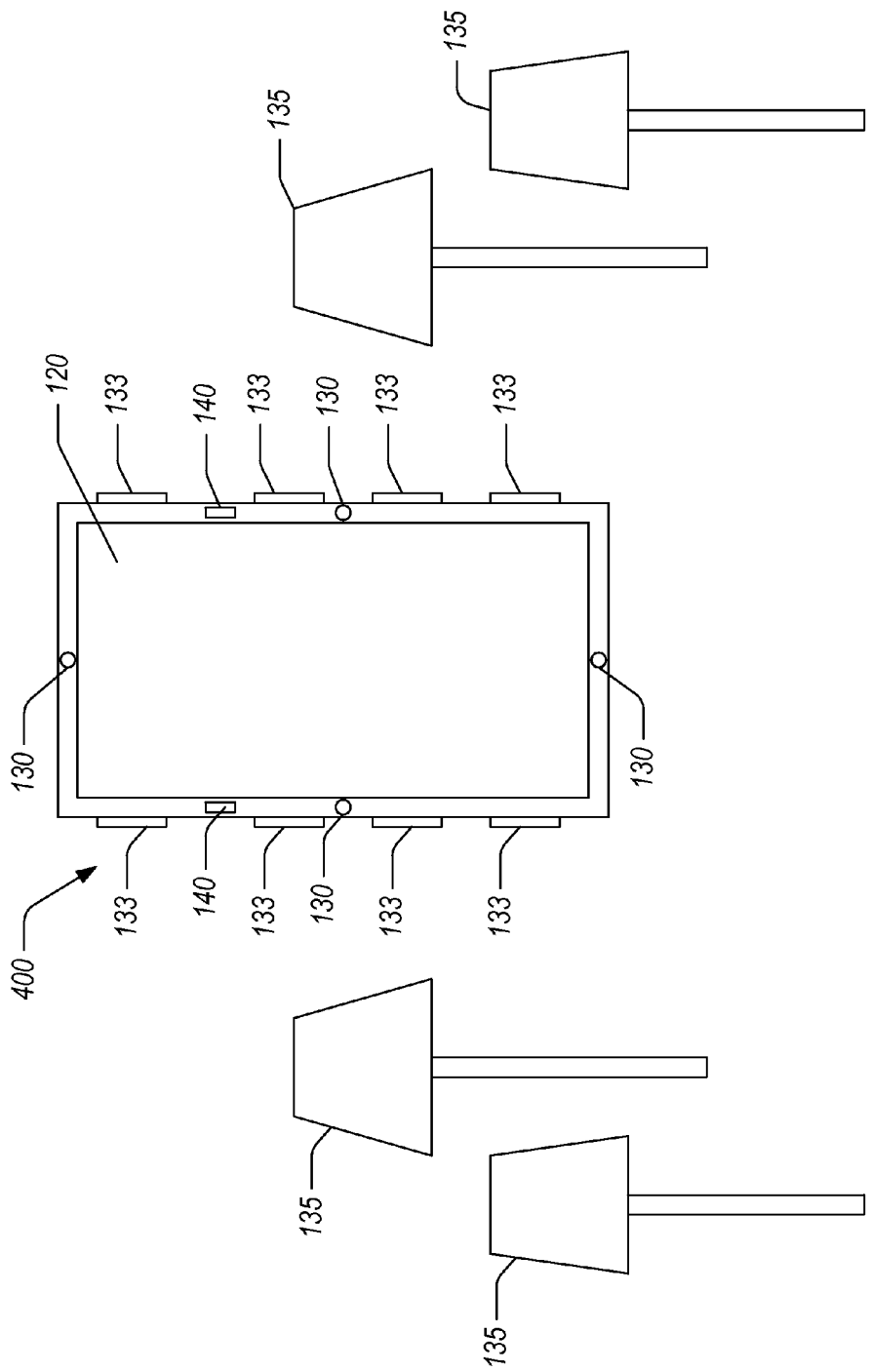
FIG. 4 illustrates an example apparatus configured to generate a blended reality view, the apparatus configured to control lighting within an environment to enhance the blended reality view.

FIG. 4 illustrates an example apparatus 400 configured to generate a blended reality view, the apparatus 400 configured to control lighting within an environment to enhance the blended reality view. The blended reality apparatus 400 includes hue lights 133 around a periphery of the mirror. The hue lights 133 can be controlled to change the color and/or intensity of light within a room and/or on a wall behind the blended reality apparatus 400 to enhance the generated blended reality view. The hue lights 133 can be any suitable light or combination of lights providing a single color or a range of colors in the visible spectrum. For example, the color and/or intensity of the hue lights 133 can be configure to change based on the blended reality view perceived by the user at the mirror 120. If the blended reality view includes the user on a boat in the ocean, the hue lights 133 can be configured to shine blue shimmering light on the walls, floor, and/or ceiling or other objects to enhance the blended reality experience. The hue lights 133 can include strands of LED lights around a frame of the blended reality apparatus 100 that change depending on what is transmitted and/or reflected by the apparatus 100.

The blended reality apparatus 400 can also be configured to control lighting fixtures 135. The lighting fixtures can be sources of diffuse light or directed light positioned throughout the environment in which the blended reality apparatus 400 will be used. The lighting fixtures 135 can provide isotropic, diffuse, anisotropic, and/or directional light (e.g., spotlights). However, the lighting fixtures 135 and the hue lights 133 differ from the projectors 130 in that the projectors 130 can modulate the light they produce to provide a targeted or desired light output (e.g., by modulating pixels to project a pattern of light that can change over time) whereas the lighting fixtures 135 and/or hue lights 133 can be controlled to change a direction, brightness and/or color of the light, but not to generate a targeted pattern of light output.

Figure 5A:
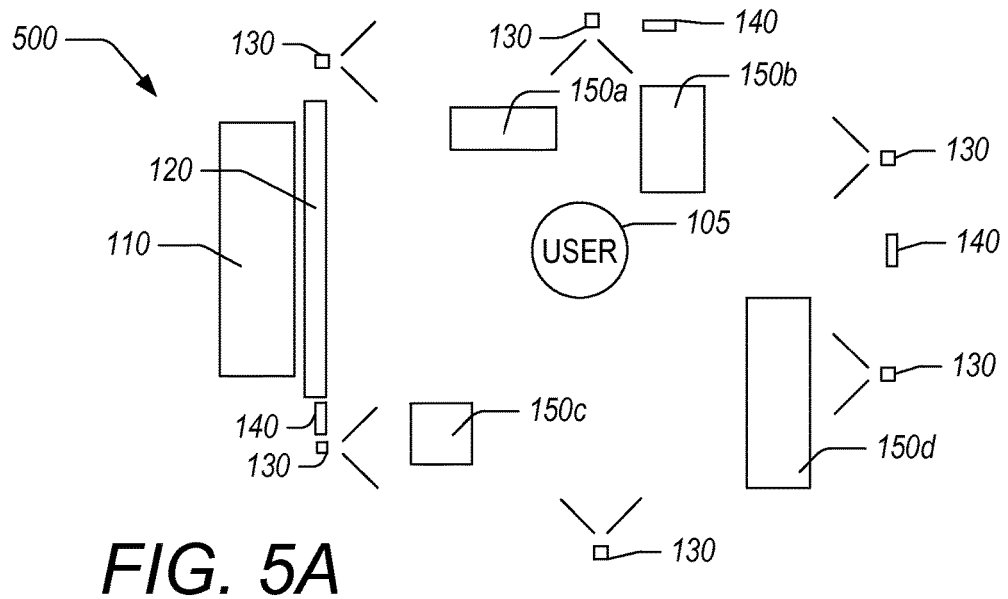
FIG. 5A illustrates a top view of an example apparatus for generating a blended reality view, the apparatus including projectors and cameras positioned around and within an environment in front of a mirror.

FIG. 5A illustrates a top view of an example blended reality apparatus 500 for generating a blended reality view, the blended reality apparatus 500 including projectors 130 and cameras 140 positioned around and within an environment in front of a mirror 120. The projectors and cameras 140 positioned in such a manner can improve the generated blended reality view. For example, cameras 140 positioned around the environment can be used to improve the scan of the environment and the resulting virtual model. An improved virtual model can be used to improve control of the projectors 130 to more exactly illuminate desired surfaces. Similarly, projectors 130 positioned around the environment can be used to improve the targeted illumination of surfaces by providing additional angles and optical pathways to surfaces that may otherwise be occluded. The cameras 140 and projectors 130 can be positioned at various heights with various pointing angles. For example, cameras 140 and/or projectors 130 can be positioned on ceilings, walls, objects, floors, and/or other surfaces. This can advantageously increase the ability to selectively illuminate objects 150*a-d* and/or not illuminate these objects.

In some embodiments, the additional cameras 140 and projectors 130 can be used to provide additional views of the user in addition to and/or instead of reflected views of the user. For example, cameras 140 positioned behind the user can provide a rear view of the user so that the user can see how clothes appear from that angle.

Figure 5B:
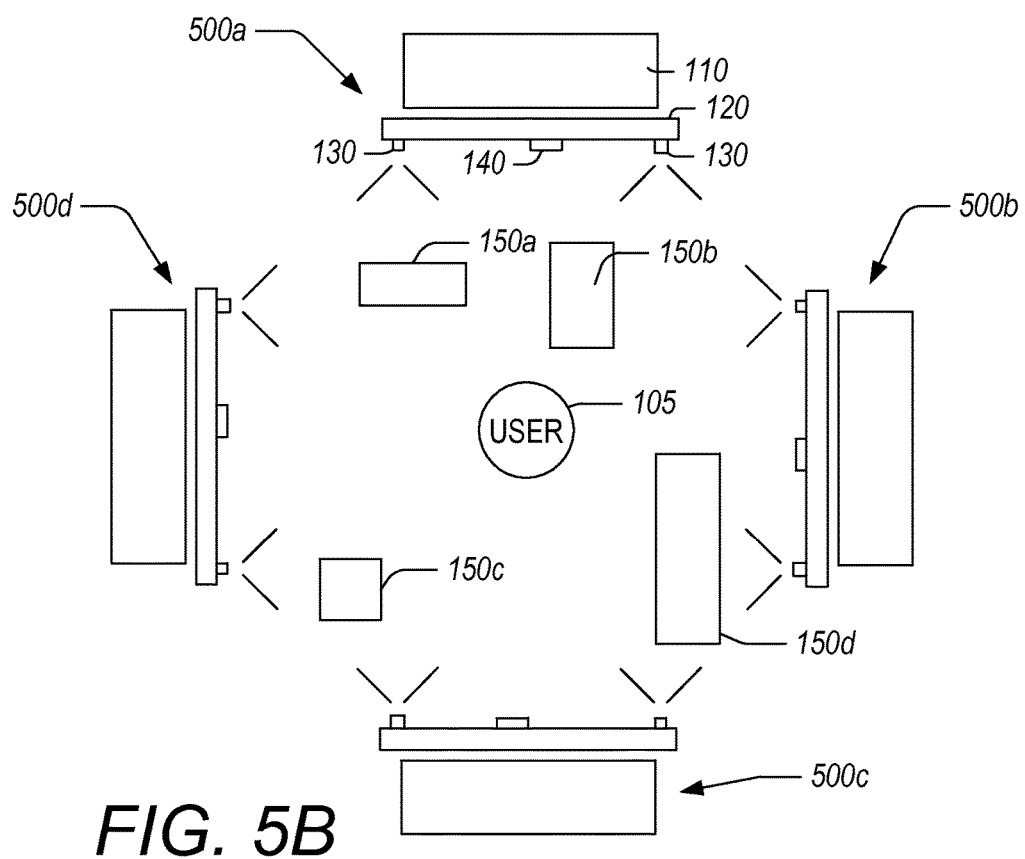
FIG. 5B illustrates a top view of a blended reality system comprising a plurality of blended reality apparatuses, each blended reality apparatus configured to generate a blended reality view.

FIG. 5B illustrates a top view of a blended reality system 550 comprising a plurality of apparatuses 500*a-d*, each blended reality apparatus 500*a-d* configured to generate a blended reality view for a user 105. Each blended reality apparatus 500*a-d* can include a display device 110, a mirror 120, projectors 130, and one or more cameras 140. Each blended reality apparatus 500*a-d* can operate independently to generate blended reality views for the user. In some embodiments, the blended reality apparatuses 500*a-d* are communicably coupled so that each apparatus 500*a-d* can receive, for example, image data from the cameras 140 of the other apparatuses and/or control the projectors 130 of the other apparatuses. For an individual blended reality apparatus, this can provide the advantages described with respect to the blended reality apparatus 500 described herein with reference to FIG. 5A. As an example use, the blended reality system 550 can be used in retail outlets in dressing rooms or other areas where users try on clothes prior to purchasing them. The blended reality system 550 can be used to provide a plurality of simultaneous blended reality views for the user, generating an immersive blended reality environment.

Figure 6A:
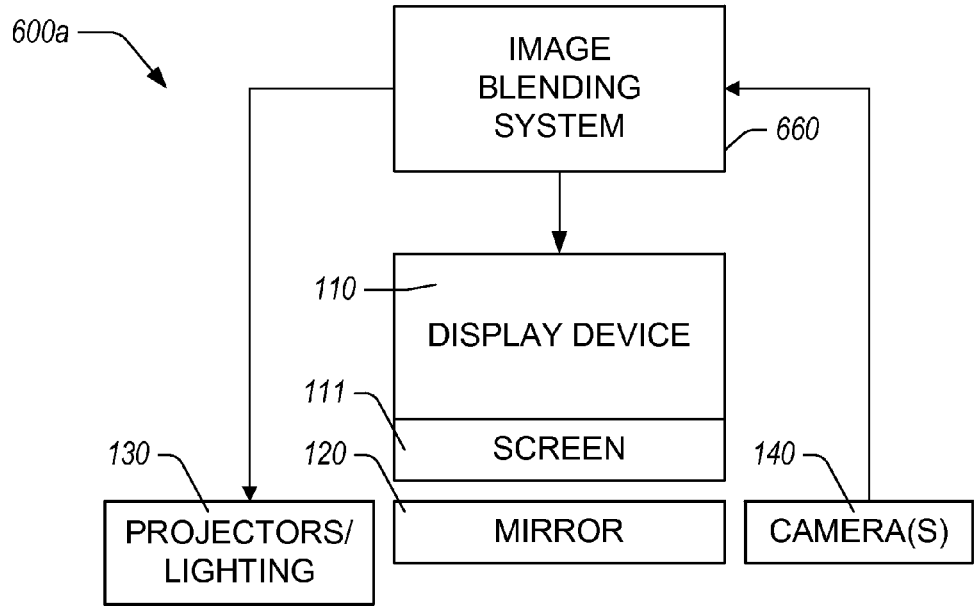
FIGS. 6A and 6B illustrate functional block diagrams of example blended reality systems comprising an image blending system.

FIG. 6A illustrates a functional block diagram of an example blended reality apparatus 600*a* comprising an image blending system 660. The blended reality apparatus 600*a* is configured to acquire image data with the camera(s) 140, process that image data with the image blending system 660, and to control the light output of the projectors 140 and/or other lighting (e.g., lighting fixtures or hue lights) to control which objects in an environment are reflected to a user for viewing. In addition, the image blending system 660 controls the display device 110 to generate images at a screen 111 for transmission through the mirror to the user. The combination of the reflected light and the transmitted light forming a blended reality view based on the image information provided by the camera(s) 140. The image information provided by the camera(s) 140 to the image blending system 660 can include scans of the environment in front of the mirror 120, images of the user, and/or depth information for objects and/or surfaces in the environment. In some embodiments, the camera(s) 140 can detect motion of the user or other objects in the environment to allow the image blending system 660 to actively compensate for such movement in real time.

Figure 6B:
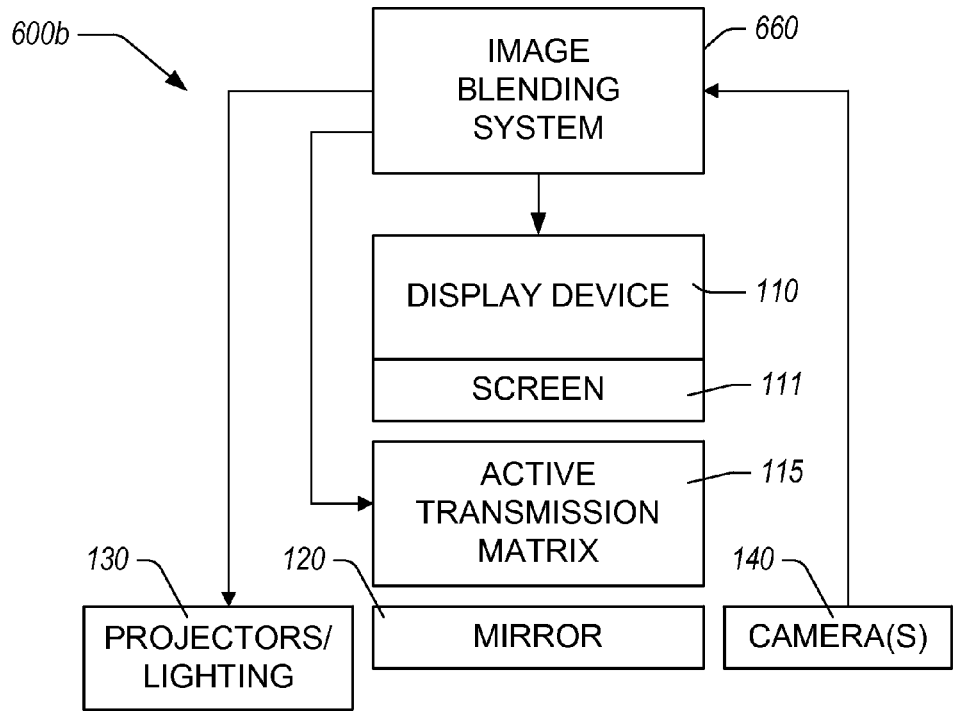

FIG. 6B illustrates a functional block diagram of an example blended reality apparatus 600*b* comprising the image blending system 660 with an additional active transmission matrix 115 relative to the blended reality apparatus 600*a* described with reference to FIG. 6A. The active transmission matrix 115 can further be controlled by the image blending system 660 to provide greater control over the transmission of light from the screen 111 of the display device 110 and/or to provide greater control over the reflective properties of the mirror 120.

Figure 7:
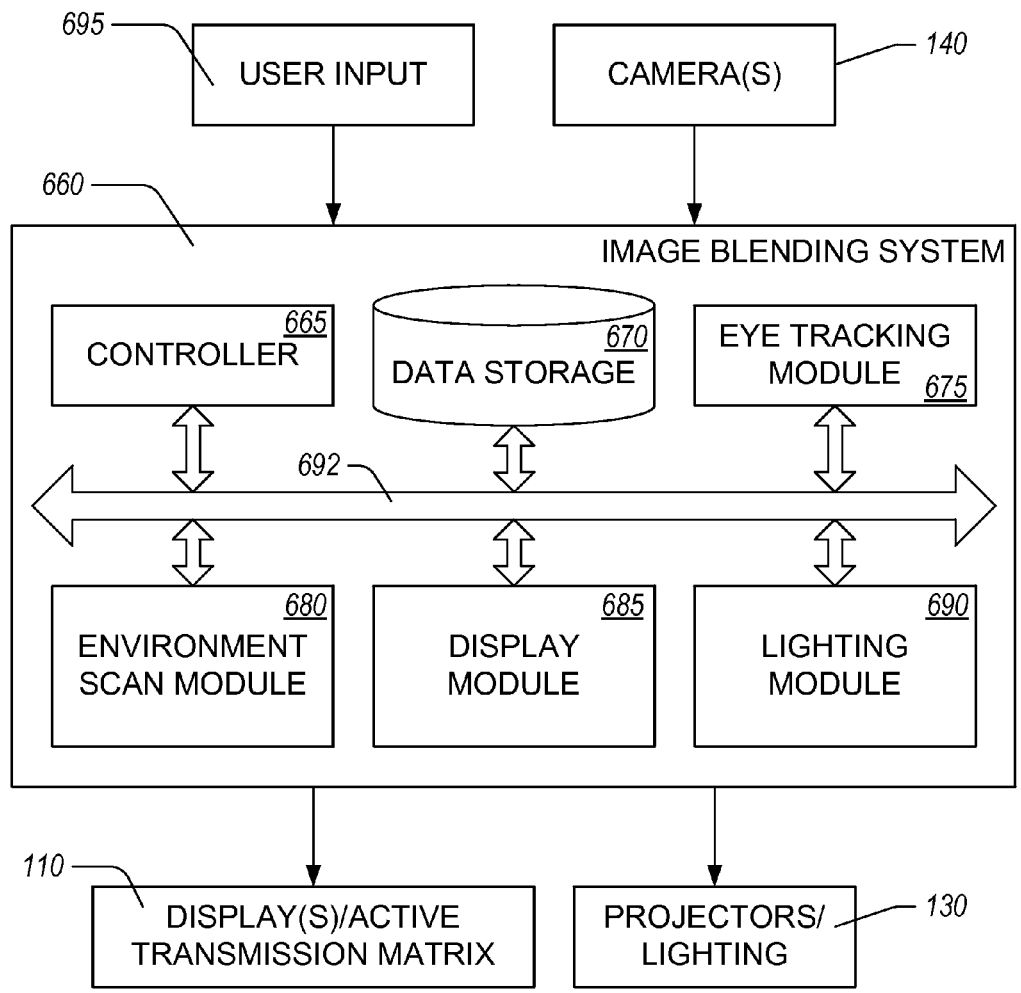
FIG. 7 illustrates a functional block diagram of an example imaging blending system.

FIG. 7 illustrates a functional block diagram of an example imaging blending system 660. The image blending system 660 can receive input from the camera(s) 140 as well as user input 695. The user input 695 can be received via voice commands, motion-based commands, touch interface controls, wireless signals, or the like. The image blending system 660 can include a controller 665 and data storage 670 configured to respectively execute and to store computer executable instructions for performing the functions described herein. The components and modules of the image blending system 660 communicate with one another via communication bus 692 that can include wired communication, wireless communication, or a combination of wired and wireless communication. In some embodiments, the components and modules of the image blending system 660 form a single computational system comprising computational hardware. In some embodiments, components of the image blending system 660 can be distributed among other components of a blended reality apparatus. For example, eye tracking functionality can be implemented by an eye tracking module 675 that can be include in one or more cameras 140.

The image blending system 660 includes an eye tracking module 675 configured to analyze image data acquired by the cameras 140 and to determine an eye location of a user. The eye tracking module 675 can use any suitable method for determining eye position such as using an IR beam and IR camera to identify retinal reflections. Other example methods and systems are described in U.S. Pat. No. 8,408,706 entitled "3D Gaze Tracker," U.S. Pat. No. 6,578,962 entitled "Calibration-Free Eye Gaze Tracking," and U.S. Pat. No. 7,197,165 entitled "Eye Tracking Using Image Data," each of which is incorporated herein by reference in its entirety. In some embodiments, the eye tracking module 675 is configured to track eye movements of the user in real time or in near real time. For example, the eye tracking module 675 can be configured to track eye movement of the user with sufficient speed to allow a blended reality apparatus to modify the transmitted and/or reflected light at the mirror so that the user does not notice any lag between the user's movement and updates to the blended reality view provided.

The image blending system 660 includes an environment scan module 680 configured to analyze image data acquired with the cameras 140 of the environment around a blended reality apparatus. The environment scan module 680 can receive image data from the cameras of one or more views of the environment where the blended reality apparatus is used to determine positions and orientations of objects and/or surfaces in the environment. The environment scan module 680 can then construct a digital representation of the environment using a three dimensional virtual model. This model can be used to perform reverse ray tracing or other techniques by the image blending system to determine what light to transmit by the display 110 and what patterns to project with the projectors 130. The environment scan module 680 can be configured to scan the environment upon an initial setup, when commanded by a user, when the image blending system 660 identifies changes to the environment, or at designated times or intervals. The environment scan module 680 can be configured to compare current image data to previously acquired image data to determine if there have been changes to the environment. If changes are detected, the environment scan module 680 can generate a new three dimensional virtual model of the environment. In this way, the virtual model can be updated to provide updated blended reality views when objects or surfaces change in the environment.

The image blending system 660 can include a display module 685 configured to determine the pattern of light to transmit by the display 110 and/or the pattern of pixels to turn off or on by the active transmission matrix. The display module 685 can analyze the virtual model along with the image data from the camera(s) 140 to determine where the user's eyes are and what virtual images are to be provided for the targeted or desired blended reality view. The display module 685 can communicate with the display(s)/active transmission matrix 110 to control transmission of light based on this information.

The display module 685 can be configured to provide different views for a left and a right eye of a user. This can be used to provide stereoscopic views for the user enhancing the sensation of depth in the transmitted images. In some embodiments, the display 110 can include a lenticular lens array and/or use polarized light in conjunction with polarized glasses to provide the stereoscopic experience for the user. In some implementations, the display module 685 can be configured to selectively blur images based on where the user is looking. This can be done to enhance the effect of depth in a transmitted scene. In certain implementations, blurring can be used by the display module 685 to simulate the depth of field of the user's vision to compensate for focal distances to images that the user is not focusing on.

The image blending system 660 can include a lighting module 690 configured to control each projector and/or other lighting element 130 to generate the desired or targeted light patterns. The targeted light patterns can be configured to selectively illuminate the user and/or other objects or surfaces in the environment so that the user sees the reflection of those objects in the mirror. For each projector 130, the lighting module 690 can determine the targeted light pattern by analyzing the virtual model generated by the environment scan module 680. For example, knowing the position of a particular projector, the lighting module 690 can be configured to determine a light pattern that shines light on a targeted surface while leaving other surfaces without illumination. The lighting module 690 can determine the light output for each projector 140 as well as the combined light output of a plurality or all the projectors 140 to determine the final lighting effect. The lighting module 690 can thus adjust the light output (e.g., light pattern, light intensity, and/or light color) to selectively illuminate objects so they are viewed as reflections in the mirror by the user.

In some embodiments, the lighting module 690 and the display module 685 can work together to supplement and/or enhance the output of the projectors 130 and the display 110. For example, where the display module 685 controls the display 110 to transmit images of a beach scene, the lighting module 690 can generate complementary light patterns to improve the visual appearance of the beach scene by projecting the light patterns on a wall or other surface. The result being that the user sees a combined transmitted image and a reflected image of a beach scene, enhancing the immersive and realistic quality of the blended reality view. Similarly, the display module 685 can control the display 110 to transmit images of objects in the room with modifications while the lighting module 690 can control the projectors to selectively illuminate the objects. The result being that the user sees the reflection of the objects combined with transmitted images on those objects, thus enhancing the blended reality view.

Figure 8:
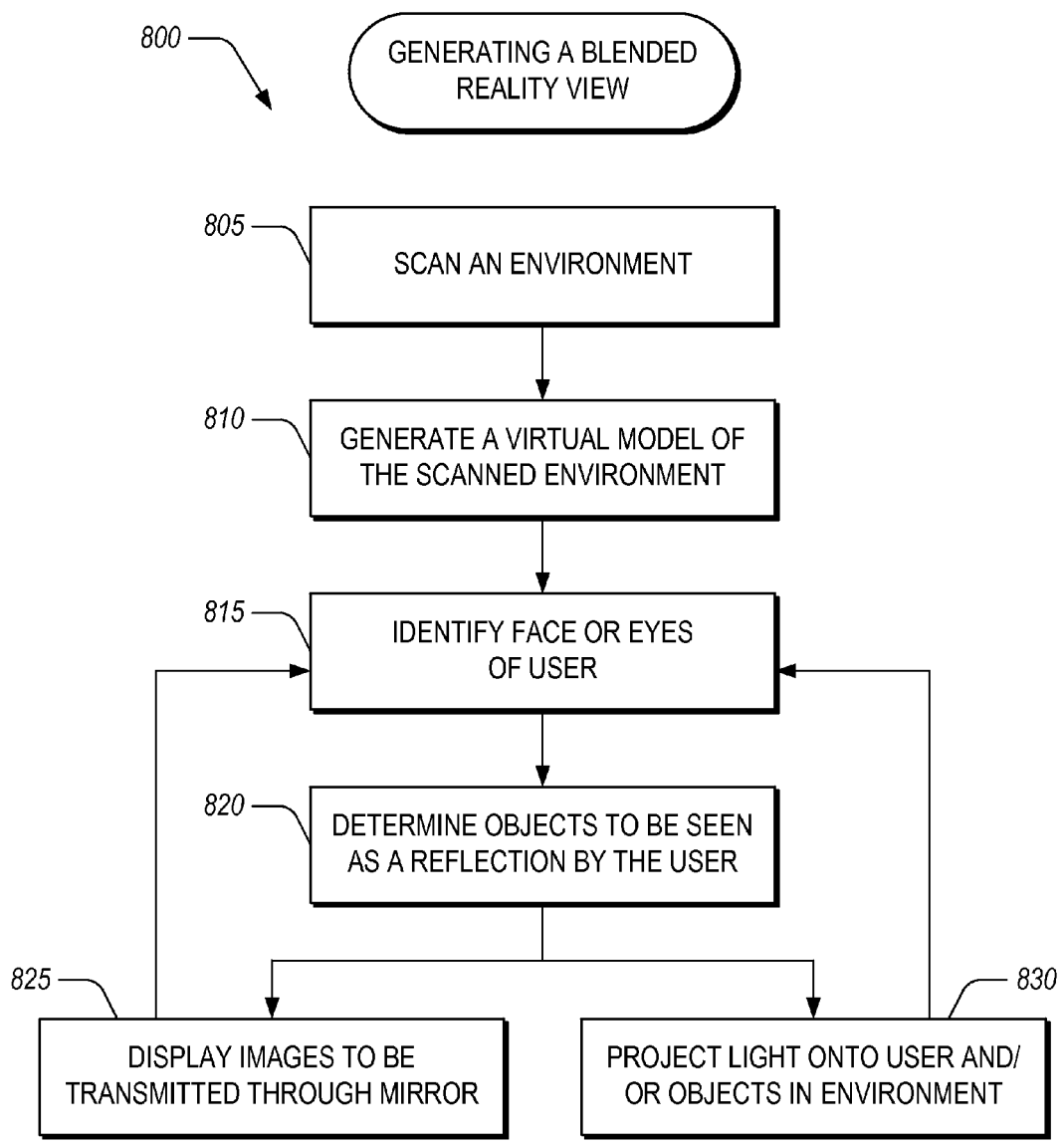
FIG. 8 illustrates an example method for generating a blended reality view.

FIG. 8 illustrates an example method 800 for generating a blended reality view. The method can be performed by any of the blended reality apparatuses or systems described herein. For ease of description, the method will be described as being performed by a blended reality apparatus, but each step or combination of steps in the method can be performed by a single component or a combination of components in the blended reality apparatus or system.

In block 805, the blended reality apparatus scans an environment with one or more cameras. The environment can include a room or other location in which the blended reality apparatus is positioned. In some embodiments, the environment includes all objects and/or surfaces in front of the mirror, where the front of the mirror is the part of the mirror viewed by a user to view their reflection. In some embodiments, the environment includes additional areas that are not in front of the mirror or which are not visible as reflections when positioned in front of the mirror. The scan of the environment can include acquiring image data, depth information, and/or other information about the positions, orientations, and/or optical characteristics of objects and surfaces within the environment.

In block 810, the blended reality apparatus generates a virtual model of the scanned environment. The virtual model can be a digital representation of the objects and surfaces within the environment, where the positions and orientations of the objects and surfaces are represented. The virtual model can include information about the optical characteristics of those objects and surfaces for purposes of reverse ray tracing when generating a blended reality view. In some implementations, the virtual model includes information about optical characteristics and/or positions of surfaces of the scanned environment, but it is not a digital representation of the objects and surfaces within the environment.

In block 815, the blended reality apparatus uses image data from one or more cameras to identify a face and/or eyes of a user. The blended reality apparatus can track the user's face and/or eyes in real time to update the blended reality view to compensate for movements of the user.

In block 820, the blended reality apparatus determines objects or surfaces to be seen as reflections by the user. To generate the blended reality view, the apparatus blends reflections of objects and/or surfaces in the environment, including portions of the user, with transmitted images. In block 825, the blended reality apparatus generates images to be transmitted by a display through a mirror to the user. In block 830, the blended reality apparatus projects light onto the user and/or surfaces in the environment so that these things will be viewed as reflections in the mirror. By controlling the amount, quality, and pattern of light projected by each projector, the reflected images can be controlled selectively reflect portions of the user and/or environment. The reflected images and transmitted images can be perceived by the user simultaneously, resulting in a blended reality view. After performing the steps in blocks 825 and 830, the method returns to block 815 to update the information related to the position of the face and/or eyes of the user. The method can thus track in real time the position of the face and/or eyes of the user to update the blended reality view so that the view changes as the user moves.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal. A software module can comprise computer-executable instructions which cause a hardware processor to execute the computer-executable instructions. The computer-executable instructions can comprise a scripted computer language and/or a compiled computer language. Computer-executable instructions can comprise, for example and without limitation, JAVASCRIPT®, PYTHON™, php, SQL, C, C++, JAVA®, C#, Fortran, BASIC, shell scripts, Perl, or the like.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. An apparatus to provide a view of reflected and transmitted light to create a visual effect that combines reflected images and transmitted images, the apparatus comprising:

a display configured to display images;

a mirror having a first side and a second side opposite the first side, the display facing the second side of the mirror, the mirror being partially-reflective and partially-transmissive such that at least a portion of light provided by the display passes through the mirror and is visible from the first side of the mirror;

a frame surrounding the mirror;

a plurality of projectors positioned on the frame and configured to illuminate a user and object elements facing the first side of the mirror;

a camera configured to acquire image data of the user and object elements; and an image blending system communicably coupled to the display, the plurality of projectors, and the camera, the image blending system configured to:

in a scanning phase, analyze image data received from the camera to determine locations of the user and object elements;

in a tracking phase, analyze the image data received from the camera to determine a location of the user's eyes, the location of the user's eyes including a height and a distance of the user's eyes relative to the mirror;

control the plurality of projectors to illuminate at least some of the user and object elements such that light from the illuminated user and object elements is reflected by the mirror to form reflected light, the reflected light visible from the first side of the mirror within a first portion of the first side of the mirror; and control the display to output display light, wherein a first portion of the display light corresponds to an image, wherein the first portion of the display light passes from the second side of the mirror to the first side of the mirror such that the first portion of the display light is visible from the first side of the mirror within a second portion of the first side of the mirror, wherein a second portion of the display light passes from the second side of the mirror to the first side of the mirror at a location corresponding to the first portion of the first side of the mirror, and wherein the second portion of the display light has a light intensity lower than a light intensity of the reflected light such that the reflected light is visible instead of the second portion of the display light;

wherein at least a portion of the reflected light and the display light combine to form a composite image.

2. The apparatus of claim 1 further comprising a lighting fixture, wherein the image blending system is further configured to control the intensity of light output by the lighting fixture to enhance the composite image.

3. The apparatus of claim 1 further comprising an active transmission matrix comprising a two-dimensional array of pixels, the active transmission matrix positioned between a screen of the display and the mirror, wherein the image blending system is further configured to control the transmissive properties of the two-dimensional array of pixels of the active transmission matrix to control the display light transmitted through the mirror to improve control of a contrast between the reflected light and the display light.

4. A method of generating a combined image at a targeted location that combines reflected images and transmitted images, the method comprising:

acquiring image data of surfaces in an environment;

generating a virtual three dimensional model of the surfaces in the environment by analyzing the acquired image data;

acquiring image data of an object positioned within the environment;

identifying a target on the object by analyzing the acquired image data;

generating images that are transmitted through a mirror from a first side of the mirror to a second side of the mirror such that the images are visible to the identified target on the object from the second side of the mirror; and projecting light onto selected surfaces in the environment to selectively illuminate the selected surfaces such that light from the illuminated selected surfaces is reflected by the mirror to form reflected light, the reflected light visible from the second side of the mirror within a first portion of the second side of the mirror, wherein a light intensity associated with the images within the first portion of the second side of the mirror is lower than a light intensity of the reflected light such that the reflected light is visible instead of the images within the first portion of the second side of the mirror, and wherein a combined image is visible to the identified target, the combined image comprising an image associated with the reflected light and the images transmitted through the mirror.

5. The method of claim 4, wherein generating the virtual three dimensional model of the surfaces in the environment comprises determining distances to the surfaces.

6. The method of claim 4 further comprising modifying light within the environment to enhance the combined image.

7. The method of claim 4, wherein identifying the target on the object is performed in real time to modify the generated images and the projected light based on movements of the identified target.

8. The method of claim 4 further comprising determining for each of a plurality of projectors a pattern of light to project to selectively illuminate the selected surfaces.

9. An apparatus comprising:
a display device comprising a screen;
a planar reflective surface positioned adjacent to the screen of the display device, the planar reflective surface configured to allow transmission of light from the screen through the planar reflective surface to a viewing side of the planar reflective surface;
a plurality of projectors configured to project light onto surfaces on the viewing side of the planar reflective surface;
an image acquisition device positioned to acquire images of the surfaces on the viewing side of the planar reflective surface; and
an image blending system configured to:
receive acquired images from the image acquisition system;
control the plurality of projectors to selectively illuminate surfaces on the viewing side of the planar reflective surface such that light from the illuminated surfaces is reflected by the planar reflective surface to form reflected light; and
control the display device to illuminate a portion of the screen and to leave a portion of the screen blank such that display light corresponding to the illuminated portion of the screen passes through the planar reflective surface to the viewing side of the planar reflective surface within a first portion of the viewing side of the planar reflective surface,
wherein a light intensity of the display light is greater than a light intensity of the reflected light within the first portion of the viewing side of the planar reflective surface such that the display light is visible instead of the reflected light within the first portion of the viewing side of the planar reflective surface, and
wherein at a targeted location on the viewing side of the planar reflective surface a combined image forms, the combined image comprising the reflected light and the display light.

10. The apparatus of claim 9, wherein the plurality of projectors are adjacent to a periphery of the planar reflective surface.

11. The apparatus of claim 10, wherein the plurality of projectors includes four projectors positioned at corners of the planar reflective surface.

12. The apparatus of claim 9, wherein a surface of the screen is parallel to a surface of the planar reflective surface.

13. The apparatus of claim 9 further comprising a light source configured to vary an intensity of light output by the light source based on instructions from the image blending system.

14. The apparatus of claim 9, wherein the screen has a width that is at least 90% of the width of the planar reflective surface.

15. The apparatus of claim 9, wherein the display device is attached to the planar reflective surface.

16. The apparatus of claim 9 further comprising an active transmission matrix positioned between the screen of the display device and the planar reflective surface.

17. The apparatus of claim 9, wherein the screen is configured to output polarized light.

18. The apparatus of claim 17, wherein the screen is configured to alternately output light of orthogonal polarizations.

19. The apparatus of claim 9 further comprising a lenticular array positioned between the screen and the planar reflective surface.

20. The apparatus of claim 9, wherein the image acquisition device comprises a camera configured to detect infrared light.

* * * * *